United States Patent

[11] 3,584,954

| [72] | Inventor | Robert Nast<br>942 Glenridge Ave., North Woodmere, N.Y. 11598 |
|---|---|---|
| [21] | Appl. No. | 776,334 |
| [22] | Filed | Nov. 18, 1968 |
| [45] | Patented | June 15, 1971 |

[54] VACUUM ENLARGER EASEL
3 Claims, 7 Drawing Figs.

[52] U.S. Cl............................................... 355/73,
238/363, 355/76
[51] Int. Cl....................................................G03b 27/60
[50] Field of Search........................................ 355/73, 76;
248/363

[56] References Cited
UNITED STATES PATENTS
2,814,233 11/1957 Anander........................ 355/73

3,221,596 12/1965 Hoffman........................ 355/73
3,408,031 10/1968 Muir, Jr......................... 355/73

Primary Examiner—Samuel S. Matthews
Assistant Examiner—Richard A. Wintercorn
Attorney—Edward F. Levy ABSTRACT: A photographic enlarger easel for mounting photographic enlarging paper thereon by means of a vacuum created within the easel. Individual air chambers within the easel are arranged to underlie enlarging papers of varying sizes, and means are provided to selectively limit the vacuum condition to those chambers which underlie the paper size in use. Tapered outlets are provided on the easel and on the vacuum pump to increase the vacuum pressure within the easel.

PATENTED JUN 15 1971

INVENTOR
ROBERT NASI

BY Edward F. Levy
ATTORNEY

INVENTOR
ROBERT NAST
BY Edward F. Levy
ATTORNEY

3,584,954

VACUUM ENLARGER EASEL

The present invention relates to easels for supporting sensitized photographic paper during the enlarging process, and more particularly to a vacuum easel which retains the enlarging paper by suction action.

In the use of the photographic enlargers, it is conventional procedure for the operator to place the sensitized enlarging paper sheet on a flat easel beneath the enlarger, and then hold the paper sheet immovably in flattened condition by means of a border frame or mask which overlies the margins of the sheet. This conventional use of a masking frame is time consuming and cumbersome, and in addition it prevents the photographic image from "bleeding" or extending to the edges of the paper. Rather, the frame produces a white border surrounding the picture area. Accordingly if it is desired to obtain a picture area which extends to the paper edge, it is necessary, in a subsequent operation, to trim the print so as to cut away the white marginal border portions.

Furthermore, the use of the conventional masking frame in the photographic darkroom for retaining the paper sheet is additionally time consuming where the operator must use a different masking frame size for the various sizes of enlarging paper employed.

It has been propose to employ an enlarger easel in which the enlarging paper is mounted thereon by a vacuum condition created within the easel. Such vacuum easel has the advantages of permitting rapid mounting and removal of the enlarging paper in selected positions and permitting the reproduction of photographic images on the paper without undesired marginal borders. However, up until the present time, there has been no practical means for providing a vacuum having a sufficient suction force to hold down in flat condition double-weight enlarging paper of large size. For commercial photography, double-weight enlarging paper is most commonly used, and large sizes, such as the 11×14 inch standard size paper is widely popular. Because of its double-weight consistency, this double-weight enlargement paper has a tendency to curl, and it is difficult to maintain it in flat condition upon the enlarger easel. Vacuum easels hitherto proposed have been unable to hold down large sheets of double-weight enlarging paper, in flat condition, against their inherent tendency to curl.

Accordingly, it is an object of the present invention to provide a photographic enlargement easel which automatically retains and holds double-weight photographic paper in a flat condition, by utilizing vacuum pressure.

Another object of the present invention is to provide a vacuum enlargement easel system which provides a greater vacuum static pressure than otherwise obtainable from a given vacuum pump.

Still another object of the present invention is to provide a vacuum enlargement easel system in accordance with the preceding object wherein there is incorporated a novel air duct system interconnecting the vacuum pump and the easel whereby there is obtained a greater vacuum pressure within the easel than has been obtainable heretofore.

A further object of the invention is the provision of a vacuum enlargement easel system of the character described which includes means for selectively applying vacuum conditions within the easel for obtaining optimum retaining properties for enlargement papers of varying sizes.

In accordance with the principles of the present invention, there is provided a photographic enlarger easel comprising an easel housing having vacuum inlet means and a flat top wall having a series of apertures therethrough. The easel housing encloses at least one suction chamber which is in communication with the easel vacuum inlet means and with the atmosphere through the apertures in the easel housing top wall. There is further provided a vacuum pump for creating a vacuum pressure in the suction chamber and air duct means interconnecting the vacuum pump and the easel vacuum inlet means which provides a low-loss air pressure connection between the vacuum pump and the suction chamber and provides a backlog of vacuum for the suction chamber to thereby provide a high static vacuum pressure in the suction chamber at the apertures, so that when photographic enlarging paper is placed on the easel housing top over the apertures, the paper is retained thereon in a secured flat condition.

Figure 1:
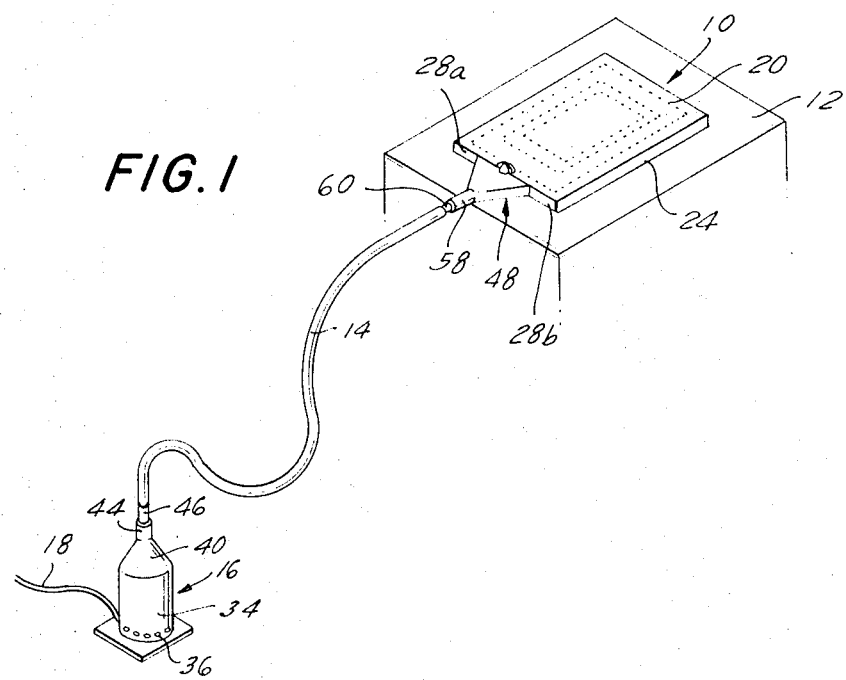
FIG. 1 is a perspective view of a vacuum enlarger easel assembly constructed in accordance with the principles of the present invention showing a vacuum enlarger easel connected to a vacuum pump.

Referring in detail to the drawings, and in particular to FIG. 1, there is shown a vacuum easel assembly made in accordance with the present invention and including an enlarger easel 10 seated upon a support surface such as a workbench 12, and connected through a flexible hose 14 to an electrically driven vacuum pump 16 which may be suitably connected to a source of electrical power by a line cord 18.

Figure 3:
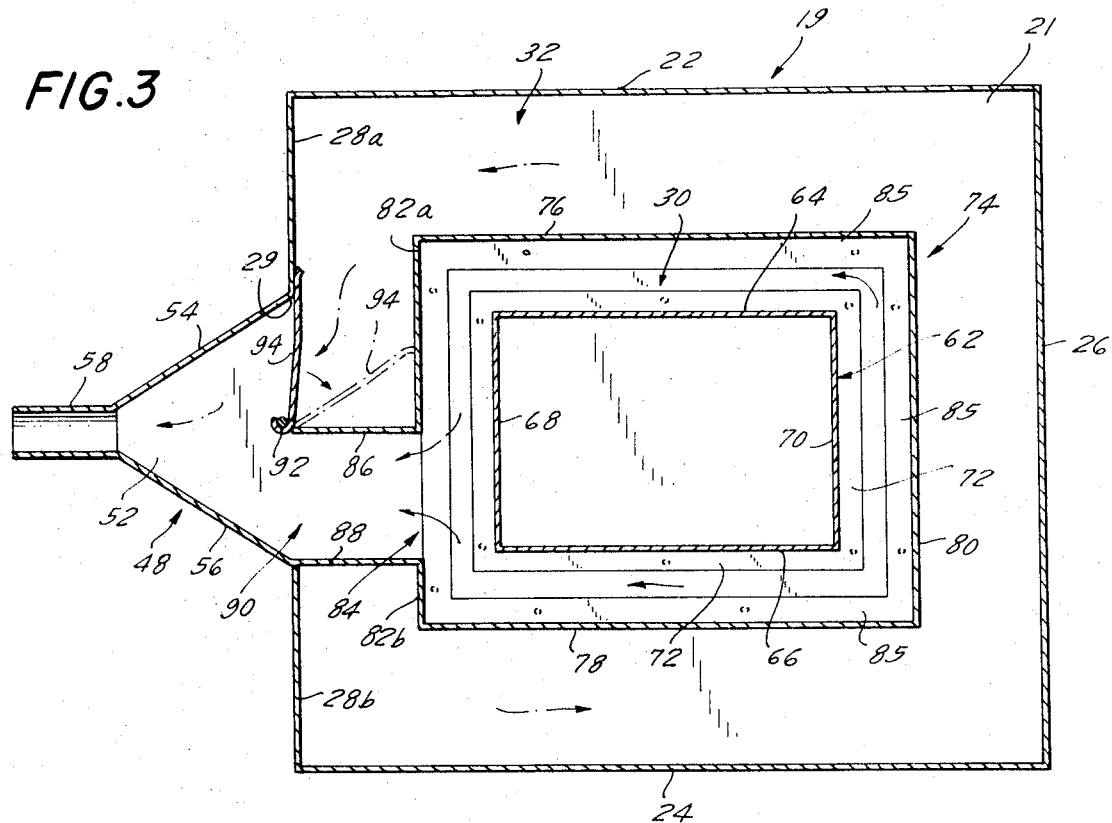
FIG. 3 is a central horizontal section through the enlarger easel of FIG. 2.

The easel 10 includes a hollow housing 19 which is preferably made of metal and which is covered by a top wall 20 which may also be made of metal, but which is preferably made of composition board, plastic, or other tough and chemical-impervious sheet material. The hollow housing 19 is in the form of a shallow, flat tray of rectangular shape having a bottom wall 20, sidewalls 22, 24, rear end wall 26 and front end wall sections 28a and 28b. As shown in FIG. 3, the front end wall sections 28a and 28b are spaced apart at the center of the easel to provide an elongated rectangular air outlet aperture 29 therebetween. The hollow interior of the housing 19 is partitioned into inner and outer air chambers 30 and 32, these chambers being selectively in communication with the vacuum pump 16, as hereinafter described.

Figure 7:
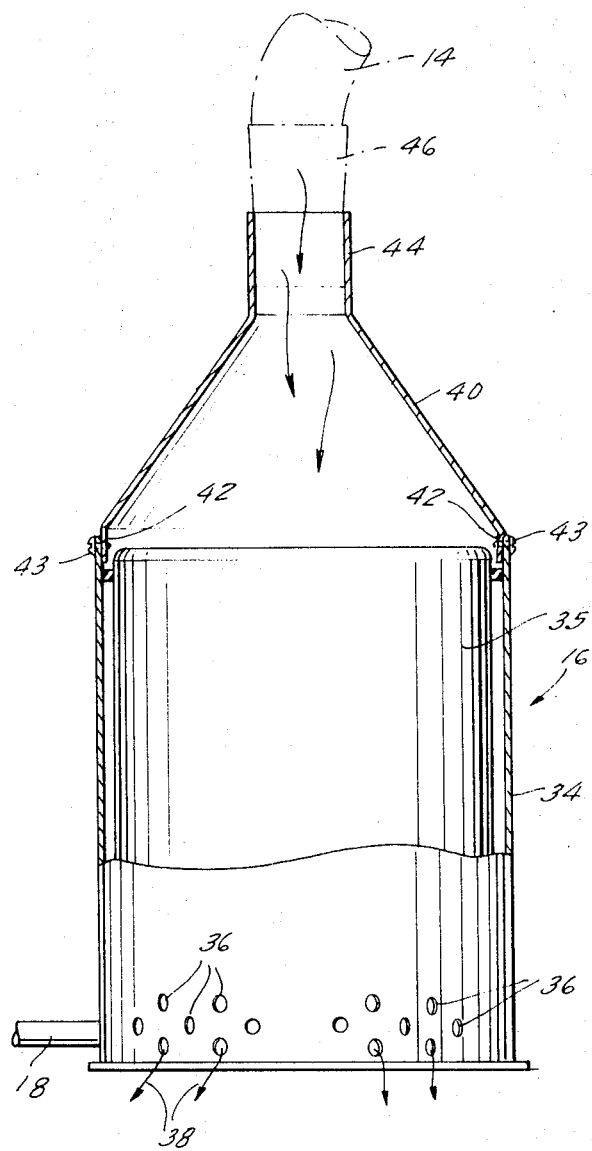
FIG. 7 is an enlarged elevation view of the vacuum pump of FIG. 1 with portions broken away and shown in section to reveal inner constructional details.

Referring to FIG. 7, vacuum pump 16 comprises a canister-type housing including a hollow cylindrical base portion 34 in which is mounted a motor 35 enclosing a suction fan (not shown) which is driven by said motor for expelling air through exhaust openings 36 at the lower end of the canister base 34, as indicated by arrows 38. Vacuum pump 16 further includes a conically shaped cover 40 serving as a funnel duct in a manner to be presently explained. The cover 40 has a circular base flange 42 which has an airtight fit within the top open end of canister base 34, and may be releasably retained therein by screws 43 or the like. The conical cover 40 has a neck 44 of reduced diameter which is adapted to receive the usual coupling member 46 on the end of hose 16, to provide airtight communication between said hose and the interior of the vacuum pump 16.

As shown in FIGS. 1—4, the hollow housing 19 of easel 10 includes a flat flared funnel duct 48 which registers with the elongated air outlet aperture 29. The funnel duct 48 may be formed integrally with the front wall sections 28a, 28b, or may be secured and sealed thereto, as by welding or the like. The funnel duct 48 has triangular-shaped top and bottom walls 50 and 52, the bottom wall 52 being coplanar with the bottom wall 21 of easel housing 19, and the top wall 50 being aligned with the top edges of front wall sections 28a and 28b. Funnel duct 48 also includes sidewalls 54 and 56, tapering outwardly from a cylindrical neck 58 to the inner edges of front wall sections 28a and 28b which border the air outlet aperture 29. The cylindrical neck 58 is sized to receive and form an airtight seal with a coupling member 60 connected to the end of hose 14 to provide airtight communication between the interior of base 14 and the interior of funnel duct 48.

As shown in FIGS. 3—6, the inner and outer air chambers 30 and 32 are in the form of rectangular corridors, and are formed by internal partition members within the easel housing 19. For this purpose, an inverted rectangular box 62 is mounted centrally within the hollow housing 19, the box 62 having a flat top wall 63, sidewalls 64, 66, and end walls 68 and 70. The side and end walls of box 62 terminate in a continuous bottom peripheral flange 72 which projects laterally outward from the box and is secured to the bottom wall 21 of easel housing 19 by rivets or the like.

Figure 4:
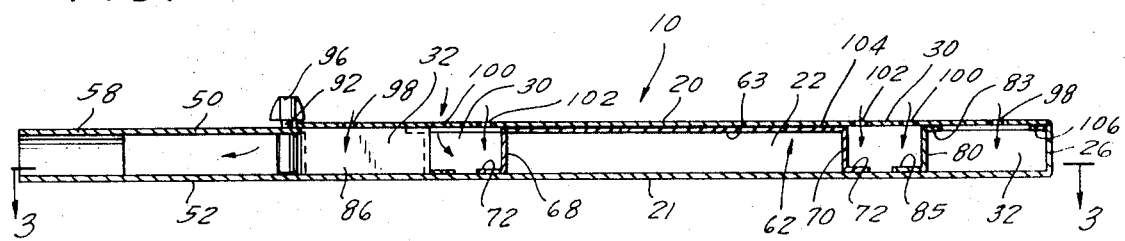
FIG. 4 is a section taken along line 4—4 of FIG. 2.
Figure 6:
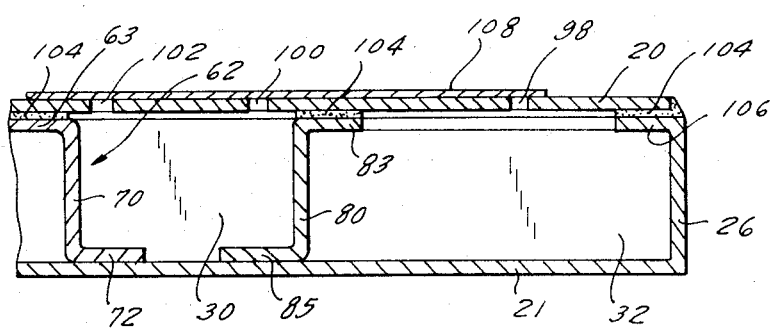
FIG. 6 is an enlarged partial section similar to FIG. 4 and showing the rear end portion of the easel.
Figure 5:
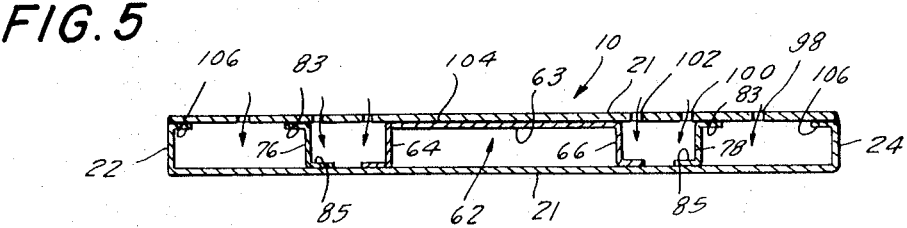
FIG. 5 is a section taken along the line 5—5 of FIG. 2.

Spaced outwardly of the inverted box 62, and surrounding the same, is a rectangular partition frame 74 having sidewalls 76 and 78, a rear end wall 80 and front end wall sections 82a and 82b spaced apart to define an offset opening 84. The walls of the rectangular partition frame 74 are integral and continuous, and each have the identical Z-shaped configuration shown in FIGS. 4—6, provided by top and bottom perpendicular flanges 83 and 85. The bottom flanges 85 are secured to the bottom wall 21 of the easel housing 19, as by rivets.

A pair of spaced walls 86 and 88 are provided as perpendicular continuations of the front wall sections 82a and 82b of partition frame 74. The walls 88 extend from one edge of the partition frame opening 84 to one edge of the easel air outlet aperture 29, as shown in FIG. 3. The outer wall 86 extends from the other edge of the opening 84 to the center of the air outlet aperture 29. It will be observed that the walls 86 and 88 form therebetween an air channel 90 leading from the inner air chamber 30 to the interior of the funnel duct 48. Rotatably mounted at the end of the wall 86, at the center of air outlet aperture 29, is an upright post 92 upon which one end of a gate flap 94 is secured for turning movement therewith. It will be seen in FIG. 3 that the gate flap 94 may be turned between the closed position shown in full line, in which it abuts and partially overlaps the front wall section 28a to close off half of the air outlet aperture 29 and seal off its communication with the outer air chamber 32, and the open position shown in broken line wherein the gate flap 94 is clear of the outlet aperture 29 and thus leaves the outer air chamber 32 in communication with the interior of funnel duct 48. A twist knob 96 is fixedly mounted at the top of post 92 and is accessible from the exterior of the easel to permit selective manual adjustment of the gate flap 94 between its open and closed positions.

Figure 2:
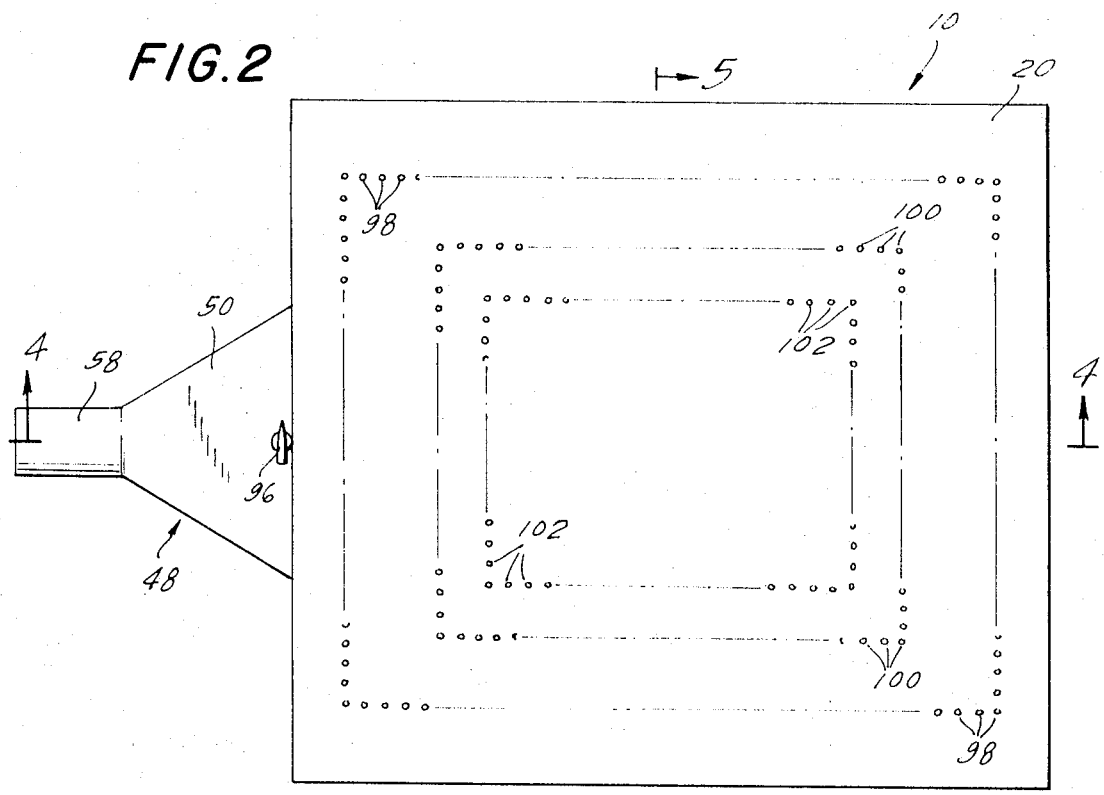
FIG. 2 is an enlarged top plan view of the vacuum enlarger easel shown in FIG. 1.

Assembly of the easel 10 is completed by the top wall 20 which has a flat upper surface serving as the supporting surface upon which enlarging paper is placed and held securely by the vacuum suction provided by the present invention. The top wall, as shown in FIG. 2, includes an outer series of spaced through perforations 98 arranged in continuous rows defining a rectangle, an intermediate rectangular series of perforations 100, and an inner rectangular series of perforations 102. These rectangular series of perforations are so sized and arranged, that when the top wall 20 is mounted on the easel housing 19, the outer series of perforations 98 overlie and communicate with the outer air chamber 32, and both the intermediate and inner series of perforations 100 and 102 overlie and communicate with the inner air chamber 30.

The physical dimensions of the inner air chamber 30 and the rectangular series of perforations 100 and 102 are such that when a standard size 8×10 inch sheet of photographic enlargement paper is centrally positioned on the easel top wall 20, the peripheral border portions of the paper sheet will overlie the rectangular series of perforations 100, as well the inner rectangular series of perforations 102, but the outer series of perforations 98 will be uncovered. Similarly, the dimensions of outer air chamber 32 and the registering outer rectangular series of perforations 98 are such that when a standard size 11×14 inch sheet of photographic enlargement paper is centrally positioned on the easel top wall 20, the border portions of this larger sheet will overlie the outer rectangular series of perforations 98, and the sheet will also overlie the intermediate and inner series of perforations 100 and 102. By way of illustration, in one commercial embodiment, the rectangle formed by the inner series of perforations 102 is dimensioned 5½ inches wide by 7½ inches long, the rectangle formed by the intermediate series of perforations 100 is dimensioned 7 11/16 inches wide by 9 5/8 inches long, and the rectangle formed by the the outer series of perforations 98 is dimensioned 10 5/8 inches wide by 13 7/16 inches long.

The easel top wall 20 is sized and dimensioned to cover over the top open end of the traylike housing 19 and to be secured in mounted position to provide an airtight seal. For this purpose a layer of adhesive 104 such as epoxy resin may be applied to the upper surfaces of the top flange 83 of the rectangular portion frame 74 as well as to the top surface of the rectangular box 62, as shown in FIG. 6. It will also be observed that the easel housing sidewalls 22, 24, an end wall 26 and front wall sections 28a, 28b are provided with a continuous inturned top flange 106 to which the adhesive layer 104 is also applied. When the top wall 20 is placed in mounted position on the aligned top flanges and top surface of box 62, the adhesive layer 104 secures the top wall 20 in mounted position and also provides an airtight seal around the top of housing 19, and between the air chambers 30 and 32.

In operation, the easel 10 is positioned beneath a photographic enlarger in the usual manner, so that the negative image is projected by the enlarger upon the face of the easel top wall 20. If an 8×10 inch sheet of enlarging paper is to be used, the operator turns the twist knob 96 so as to bring the gate flap 94 to its closed position shown in full line in FIG. 3. In this position, communication between the funnel duct 48 and the outer air chamber 32 is closed off, and there is established communication of the funnel duct 48 only with the inner air chamber 30. When the vacuum pump 16 is energized, air is drawn through the hose 14, funnel duct 48, and channel 90, and is withdrawn from the interior of inner air chamber 30, causing an inward airflow through the intermediate and inner rectangular series of perforations 100 and 102. When he 8×10 inch sheet is placed centrally upon the top wall 20, the paper sheet covers over the series of perforations 100 and 102, creating a vacuum condition within the inner air chamber 30, and the suction force thereof acting through the perforations 100 and 102 draws the paper firmly against the surface of the top wall 20, holding the paper immovable and flat against said top wall surface around the entire extent thereof, with sufficient force to overcome the inherent tendency of the paper sheet to curl. The operator may then proceed with the enlarging operation, projecting the negative image upon the paper, thus being assured that the sheet of enlarging paper is firmly retained in a fixed flat condition, free and unencumbered by any mechanical retaining devices.

Where an 11×14 inch sheet of enlarging paper is used, the operator turns twist knob 96 in the direction to move gate flap 94 to the open position shown in broken line in FIG. 2, thereby establishing communication between the funnel duct 48 and the outer air chamber 32, as well as the inner air chamber 30. When the vacuum pump 16 is energized, a vacuum condition is thus established both in inner air chamber 30 and outer air chamber 32, and air is drawn through all of the rectangular series of perforations 98, 100 and 102. With the 11×14 sheet 108 placed upon the top wall 20, as shown in FIG. 6, the marginal portion of the sheet overlies the outer rectangular series of perforations 98 and the suction force therethrough, provided by the vacuum condition in the outer air chamber 32, hold the sheet firmly in flat condition around its periphery, against the top wall surface. This holding action is also assisted by the intermediate and inner series of perforations 100 and 102, which receive their suction force from the inner air chamber 30.

An important feature of the present invention resides in the means for creating a stronger and more uniform vacuum within air chambers 30 and 32, thereby providing firmer and more reliable adhesion of photographic paper to easel top wall 20. This advantageous feature is in large part due to the unique construction and arrangement of the means for maintaining a large and uniform static suction pressure in air chambers 30 and 32, which means include funnel duct 48, airhose 14 and conical pump cover 40, which cooperate to improve the static suction pressure distribution within the easel.

It has been determined experimentally that for a given vacuum pump, the incorporation of the conical cover 40 and tapered funnel duct 48 as described herein provides an appreciably larger static pressure in air chambers 30 and 32 than is otherwise obtained when airhose 14 alone is connected directly between vacuum pump 16 and suction chambers 30 and 32. This increase in static suction pressure within the easel is attributed to the stabilization of the vacuum created therein and the elimination of those factors which would ordinarily interfere with the attaining of a static vacuum condition of optimum degree.

Because of the wide mouths of the conical cover 40 and funnel duct 48, the velocity pressure of the air withdrawn from the interior of the easel is reduced, resulting in an increase in that static pressure component of the overall vacuum system. In addition, the tapered nature of cover 40 and duct 48 eliminates duct friction resistance which would be provided by sharp corners and abrupt decreases in duct cross section, and minimizes air turbulence which would reduce the efficiency of the vacuum pump. It will further be appreciated that the vacuum loss, due to the porosity of the enlarging paper is offset by the stabilization of the vacuum within the easel, which stabilization results from the accumulated "backlog" of vacuum created in the relatively large tapered funnel duct 48 in the vicinity of the easel and by the conical cover 40 in the vicinity of the pump.

While a preferred embodiment of the invention has been shown and described herein, it is obvious that numerous omissions, changes and additions may be made in such embodiment without departing from the spirit and scope of the invention.

I claim:

1. A photographic enlarger easel comprising an easel housing having vacuum inlet means and a flat top wall for supporting an enlarger paper sheet, said top wall having a series of perforations therethrough arranged in rectangular patterns to provide an inner perforation pattern and an outer perforation pattern spaced apart from said inner perforation pattern, said rectangular patterns being suitably dimensioned whereby a standard sized sheet of enlarging paper placed on said easel top wall has its peripheral marginal portions overlying one of said perforation patterns, a pair of suction chambers enclosed in said easel housing in communication with said easel inlet means at one end and with the atmosphere through said perforations, said inner perforation pattern overlying one of said suction chambers and in air communication therewith, and said outer perforation pattern overlying said other suction chamber and in air communication therewith, said inlet means comprising a first vacuum inlet at the entrance to said one suction chamber and a second vacuum inlet at the entrance to said other suction chamber, gating means at said second inlet for selectively opening or closing said second inlet to thereby open and block vacuum communication between said duct means and said other section chamber, a vacuum pump for creating a vacuum pressure in said suction chamber, said vacuum pump comprising a cylindrical canister housing having a vacuum outlet at the upper end thereof, and air duct means comprising a flat tapered duct having its narrow end terminating in a cylindrical neck and its broad end terminating in a rectangular opening communicating with said easel inlet means, and an airhose having one end thereof connected to said cylindrical neck of said tapered duct and terminating at its other end in a cone-shaped funnel duct having an open base end connected to said canister open end, said funnel duct and said tapered duct constituting a low-loss air pressure connection between said vacuum pump and said suction chambers for providing a backlog of vacuum for said suction chambers to thereby provide a high static vacuum pressure in said suction chamber at said perforations, whereby photographic enlarging paper placed on said easel housing top over said perforations is retained thereon in a secured flat condition.

2. An enlarger easel according to claim 1 including an additional perforation pattern spaced intermediaTe said inner and outer perforation patterns, said intermediate perforation pattern overlying said one suction chamber and in air communication therewith.

3. An enlarger easel according to claim 1 wherein said gating means comprises a gate flap secured to a rotatably mounted upright post for turning movement therewith, said gate flap being turnable between a closed position to block said second vacuum inlet and an open position where said gate flap is remote from said second vacuum inlet to thereby selectively control vacuum communication between said tapered duct and said other suction chamber.